(12) United States Patent
Kusumi

(10) Patent No.: US 10,217,193 B2
(45) Date of Patent: Feb. 26, 2019

(54) IMAGE PROCESSING APPARATUS, IMAGE CAPTURING APPARATUS, AND STORAGE MEDIUM THAT STORES IMAGE PROCESSING PROGRAM

(71) Applicant: CANON KABUSHIKI KAISHA, Tokyo (JP)

(72) Inventor: Yuichi Kusumi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 250 days.

(21) Appl. No.: 15/220,484

(22) Filed: Jul. 27, 2016

(65) Prior Publication Data

US 2017/0032501 A1 Feb. 2, 2017

(30) Foreign Application Priority Data

Jul. 30, 2015 (JP) .................................. 2015-151040

(51) Int. Cl.
*G06K 9/00* (2006.01)
*G06T 5/00* (2006.01)

(52) U.S. Cl.
CPC .............. *G06T 5/003* (2013.01); *G06T 5/002* (2013.01); *G06T 2207/20016* (2013.01); *G06T 2207/20024* (2013.01); *G06T 2207/20056* (2013.01)

(58) Field of Classification Search
CPC ..................... G06T 5/003; G06T 5/002; G06T 2207/20056; G06T 2207/20024; G06T 2207/20016
See application file for complete search history.

(56) References Cited

U.S. PATENT DOCUMENTS

| 8,018,504 | B2  |   | 9/2011 | Kelly |
| 8,427,559 | B2  |   | 4/2013 | Morel et al. |
| 9,639,922 | B2  | * | 5/2017 | Watanabe ................. G06T 5/10 |
| 2011/0135213 | A1 | * | 6/2011 | Hatakeyama ........... G06T 5/003 382/254 |
| 2011/0135216 | A1 | * | 6/2011 | Hatakeyama ........... G06T 5/003 382/260 |
| 2012/0189226 | A1 | * | 7/2012 | Okada ..................... G06T 5/003 382/260 |

(Continued)

FOREIGN PATENT DOCUMENTS

JP 5337049 B2 11/2013
WO 2008088450 A1 7/2008

*Primary Examiner* — John B Strege
(74) *Attorney, Agent, or Firm* — Rossi, Kimms & McDowell LLP

(57) ABSTRACT

An image processing apparatus generates a first image by performing a resolution enhancement process for the input image, and a second image by performing a noise reduction process for a noise reduction target image. In the noise reduction process, the image processing apparatus extracts a first partial image containing a target pixel and a plurality of second partial images containing a reference pixel, calculates a correlation value between the first partial image and the plurality of second partial images, provides a weight to each of the plurality of second partial images based on a characteristic of the resolution enhancement process and the correlation value, calculates a pixel value of the target pixel using a pixel value of the reference pixel in the plurality of second partial images and the weight, and generate the second image using the calculated pixel value.

12 Claims, 4 Drawing Sheets

(56) References Cited

U.S. PATENT DOCUMENTS

2013/0038748 A1\* 2/2013 Hatakeyama ........... G06T 5/003
   348/222.1
2015/0146996 A1\* 5/2015 Watanabe ................. G06T 5/10
   382/260

\* cited by examiner

IMAGE PROCESSING APPARATUS, IMAGE CAPTURING APPARATUS, AND STORAGE MEDIUM THAT STORES IMAGE PROCESSING PROGRAM

BACKGROUND OF THE INVENTION

Field of the Invention

The present invention relates to a technology for performing a resolution enhancement process and a noise reduction process for an image obtained by image capturing.

Description of the Related Art

In capturing an object image through an image capturing apparatus, such as a digital camera, light emitted from one point on the object cannot converge into one point due to influence of an image capturing optical system (simply referred to as an "optical system" hereinafter), such as a diffraction and an aberration, and has a fine spread. This fine spread is expressed by a point spread function ("PSF"). In obtaining an image (captured image) through image capturing, the PSF is convoluted in the ideal object image. At a result, a blur occurs in the captured image and the resolution of the captured image degraded.

There is proposed a resolution enhancement process that is configured to correct such a degraded captured image using an image processing technology. For example, an image restoration process as one of the resolution enhancement processes is as follows.

Assume that f(x, y) is an original image that has not yet been degraded by an optical system, h(x, y) is a PSF, and g(x, y) is a degraded image or captured image in a real space (x, y). Then, the following expression (1) is established where * is a convolution.

$$g(x,y) = \iint f(X,Y) \ast h(x-X, y-Y) dX dY \quad (1)$$

When the expression (1) is Fourier-transformed and converted into an expression of a frequency space (u, v), the following expression (2) of a product of frequencies is obtained.

$$G(u,v) = F(u,v) \cdot H(u,v) \quad (2)$$

F(u, v) and G (u, v) are those obtained by Fourier-transforming f(x, y) and g(x, y), respectively. H(u, v) is Fourier-transformed h(x, y) or an optical transfer function ("OTF").

In order to obtain the original image from the degraded image, both sides of the expression (2) may be divided by H(u, v), as illustrated in the expression (3).

$$F(u,v) = G(u,v)/H(u,v) \quad (3)$$

The restored image as the original image f(x, y) is obtained by inversely Fourier-transforming F(u, v) or G(u, v)/H(u, v).

In actually obtaining the original image through the image restoring process, a noise contained in the degraded image is remarkably amplified. As the image restoring method for restraining a noise amplification, use of a Wiener filter expressed by the expression (4) is known.

$$\lambda^f(u, v) = \frac{1}{H(u, v)} \frac{|H(u, v)|^2}{(|H(u, v)|^2 + \Gamma)} \quad (4)$$

In the expression (4), H(u, v) is the OTF, as described above. Γ is a constant for reducing a noise gain, and usable as an adjustment term for controlling the gain. $\lambda^f$(u, v) is a frequency characteristic of a Weiner filter, and represents a frequency characteristic of the resolution enhancement process as the image restoration process.

Since H(u, v) of the actual image capturing optical system is different for each region (position) on the image, the frequency characteristic $\lambda^f$(u, v) of the resolution enhancement process illustrated by the expression (4) may be different for each region on the image. The region on the image contains one pixel.

As illustrated in the expression (5), when $\lambda^f$(u, v) is multiplied by G(u, v), a phase component of the PSF generated by the diffraction, the aberration, etc. of the optical system can be made 0 and the frequency characteristic of the amplitude component can be amplified. This configuration can provide a well restored image with a high resolution. R(u, v) is information of the frequency space of the restored image.

$$R(u,v) = G(u,v) \ast \lambda^f(u,v) \quad (5)$$

When the gain is increased by reducing Γ of the Wiener filter, the effect of the resolution enhancement process improves but the noise remarkably amplified. When the gain is reduced by increasing Γ of the Wiener filter, the noise restraining effect improves but the resolution enhancement process becomes less effective.

Japanese Patent No. 5,337,049 discloses a method for performing a noise reducing process for a resolution enhanced image obtained by a resolution enhancement process so as to maintain the effect of the resolution enhancement process and to restrain the noise. This method performs the noise reduction process using a two-dimensional filter, such as a sigma filter and an averaging filter, for the high resolution image. A parameter for the noise reducing process is varied according to the noise level determined by the function of the position on the image.

U.S. Pat. No. 8,427,559 discloses a noise reduction process using a non-local means ("NLM") filter known as a noise reducing filter that is less likely to degrade an image. This noise reduction process reduces the noise by using self-similarity of an object space and by replacing a pixel value of a target pixel with a weighted mean pixel value of a plurality of partial images similar to the partial image structure contained in the target pixel. A weight used for the weighted mean is determined by a distance between a vector generated with respective pixel values of the partial images around the target pixel as components, and a vector generated with pixel values of pixels around the target pixel as components.

However, the local noise reduction process in the method disclosed in JP 5,337,049 may deteriorate an edge etc. in the image and reduce the effect of the resolution enhancement process. The NLM filter disclosed in U.S. Pat. No. 8,427,559 can reduce the noise while maintaining the resolution, but may degrade the image and cause a residue noise depending on a set parameter.

SUMMARY OF THE INVENTION

The present invention provides an image processing apparatus, etc. which can effectively reduce a noise which would be otherwise amplified by a resolution enhancement process.

An image processing apparatus according to one aspect of the present invention is configured to perform image processing for an input image generated by image capturing through an image capturing optical system. The image processing apparatus includes a first processor configured to generate a first image by performing a resolution enhancement process for the input image, and a second processor configured to generate a second image by performing a noise reduction process for a noise reduction target image, which is the first image or an image generated from the first image. In the noise reduction process, the second processor is configured to extract a first partial image containing a target pixel and a plurality of second partial images containing and a reference pixel, from the noise reduction target image, calculate a correlation value between the first partial image and the plurality of second partial images, provide a weight to each of the plurality of second partial images based on a characteristic of the resolution enhancement process and the correlation value, calculate a pixel value of the target pixel using a pixel value of the reference pixel in the plurality of second partial images and the weight, and generate the second image using the calculated pixel value.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
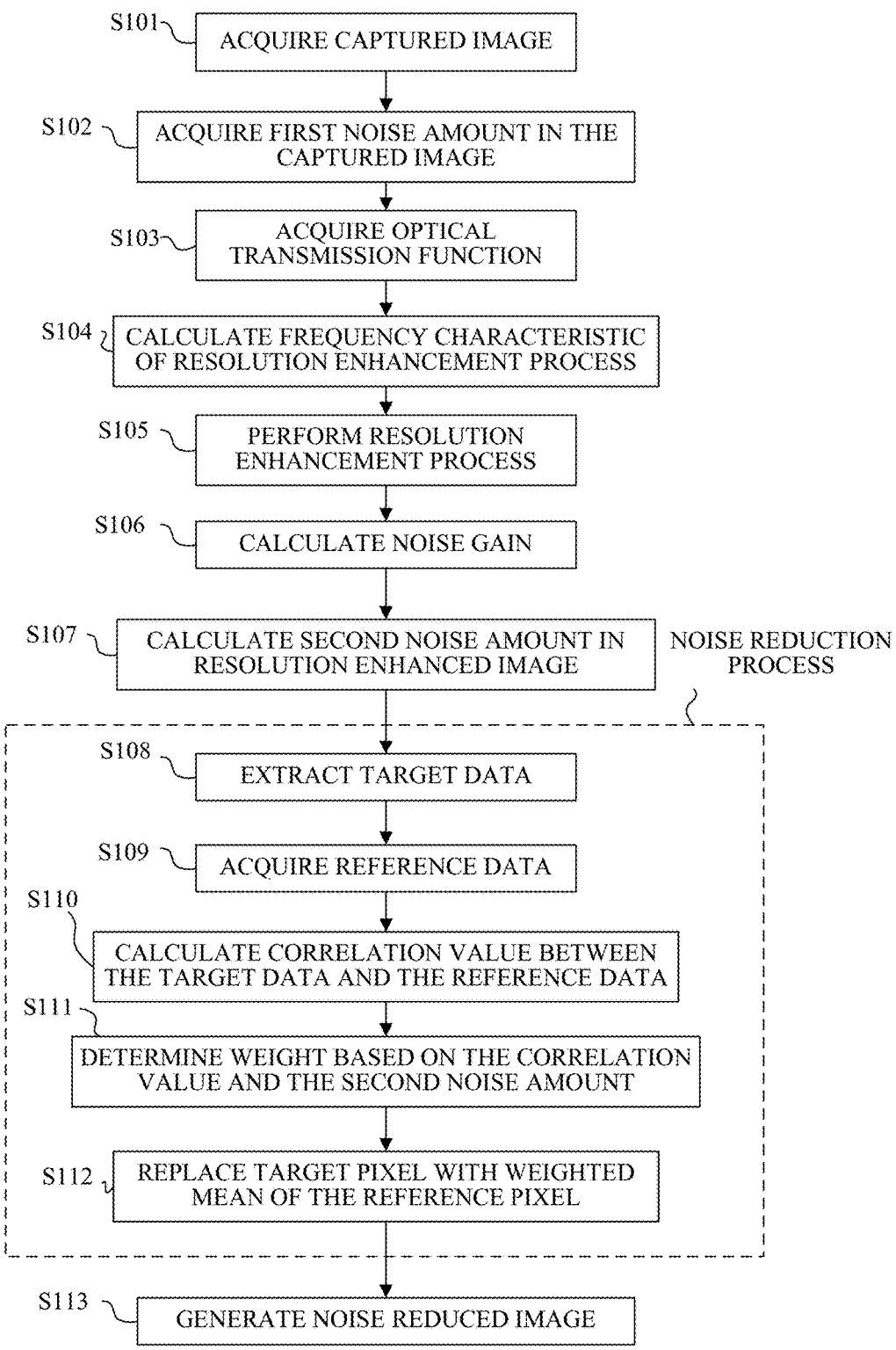
FIG. 1 is a flowchart illustrating image processing according to a first embodiment of the present invention.

FIG. 1 is a flowchart of image processing performed in an image processing apparatus according to a first embodiment of the present invention. The image processing apparatus includes a personal computer, an image processing CPU or MPU, etc., and executes this process in accordance with an image processing program as a computer program.

This image processing generates a resolution enhanced image (first image) by performing a resolution enhancement process for a captured image (degraded image) as an input image, and thereafter generates an output image (second image) by performing a noise reduction process based on a characteristic of the resolution enhancement process for the resolution enhanced image. The characteristic of the resolution enhancement process, as used herein, includes a characteristic relating to the frequency characteristic of the resolution enhancement process or a noise gain in the resolution enhancement process, as described later.

This embodiment discusses an image restoration process as the resolution enhancement process. The image processing apparatus serves as a first processor, a second processor, and a noise acquirer.

Initially, in the step S101, the image processing apparatus acquires a captured image as an input image from an image capturing apparatus, such as a digital still camera, etc. The image capturing apparatus generates a captured image by capturing an object through an image capturing optical system. The captured image may be acquired from the image capturing apparatus through a wired or wireless communication with the image capturing apparatus, or via a storage medium, such as a semiconductor memory or an optical disc. The captured image contains image capturing condition information, such as a focal length, an F-number, an image capturing distance, a luminance level, and a pixel size and ISO speed of an image sensor in the image capturing apparatus in the image capturing.

Figure 2:
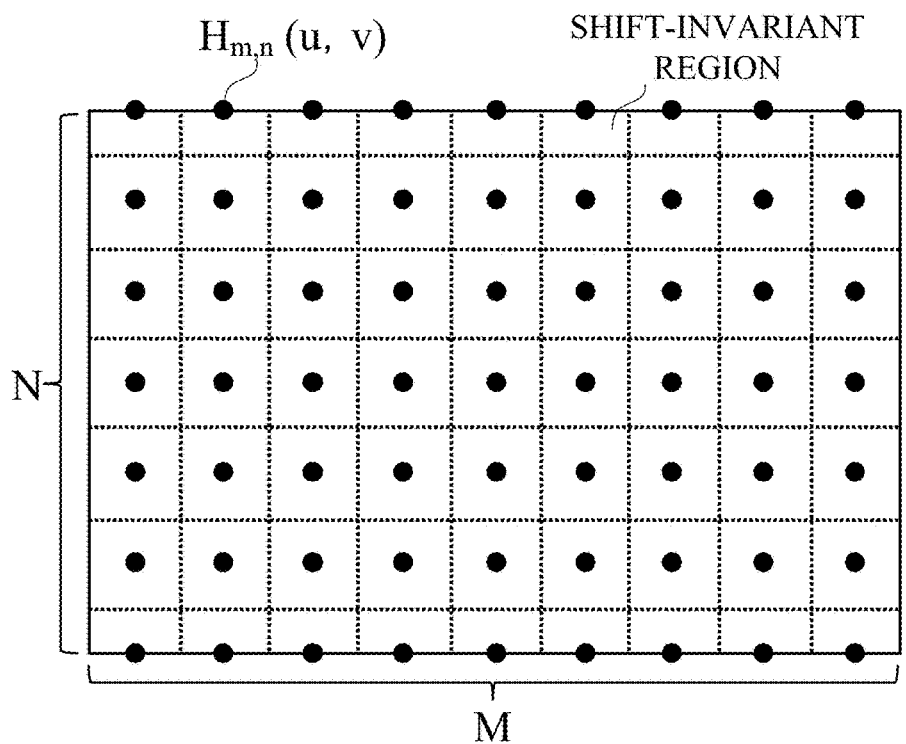
FIG. 2 is a view illustrating a shift-invariant region and an optical transmission function in an image restoration process according to the first embodiment.

FIG. 2 illustrates a captured image that is divided into M pieces in the horizontal direction and N pieces in the vertical direction. The optical characteristic of the image capturing optical system is not uniform over the entire captured image, but can be considered uniform to the region in a narrow region in the captured image. In the following description, a shift-invariant region refers to a region in which the optical characteristic of the image capturing optical system can be considered uniform, and the image processing is performed for each region (m, n). The shift-invariant region may be previously determined based on the optical characteristic of the image capturing optical system. As the number of divisions (or the number of shift-invariant regions) is increased so as to reduce the area of each shift-invariant region, the precision of the image restoration process, etc., improves but a processing speed may become slow or a data amount may increase. Thus, the number of shift-invariant regions may be determined based on the balance among them.

Next, in the step S102, the image processing apparatus calculates a noise amount $\sigma_0$ (referred to as a "first noise amount" hereinafter) contained in the captured image. The noise amount is a standard deviation of the noise distribution. The first noise amount $\sigma_0$ of the captured image is obtained, for example, by previously measuring noise amounts with a plurality of different image capturing condition information, such as the luminance level and the ISO speed, by storing the data in a memory, and by obtaining a noise amount corresponding to the capturing condition information of the captured image obtained in the step S101.

Another method for calculating the first noise amount $\sigma_0$ may use a median absolute deviation ("MAD"). The MAD is calculated by the expression (6) using a wavelet coefficient $w_{HH1}$ of a sub-band image of the highest frequency HH1 obtained by wavelet-converting the captured image.

$$\text{MAD} = \text{median}(|w_{HH1} - \text{median}(w_{HH1})|) \quad (6)$$

The first noise amount $\sigma_0$ contained in the captured image can be estimated because the MAD and the standard deviation have a relationship of the expression (7).

$$\sigma_0 = \text{MAD}/0.6745 \quad (7)$$

The first noise amount $\sigma_0$ may be obtained for each region that contains a plurality of pixels like the region (m, n) in the captured image etc., and obtained for each pixel. The step S102 may be performed after the step S103 or S104 as long as the step S102 is performed before the step S105, which will be described later.

Next, in the step S103, the image processing apparatus obtains an optical transmission function ("OTF") of the image capturing optical system. The OTF is a frequency characteristic of a PSF in the two-dimensional space, as expressed by H(u, v). The characteristic of the OTF varies according to the PSF.

There are enormous variations of the OTF depending on the image capturing conditions that are different from one another. For example, when the image capturing optical system is a zoom lens having a variable focal length, there are OTFs by the number of combinations of parameters, such as a focal length, an F-number, an image capturing distance, a position on the image, and a color (wavelength) etc. Moreover, there are variations by the number of combinations of the above parameters and a characteristic of an image sensor, such as a pixel size. Practically, the OTFs necessary for the image restoration process are obtained from among the OTFs corresponding to the combinations of the parameters. This embodiment previously calculates the available OTFs using optical CAD etc., and stores the calculated OTFs as the OTF database in a memory suitable for the image restoration process. The image processing apparatus obtains the image capturing condition information, such as the focal length, the F-number, and the image capturing distance used for image capturing, and the pixel size, based on the captured image obtained in the step S101, and acquires the OTF corresponding to the obtained image capturing condition information among the OTFs stored in the OTF database.

OTFs other than the obtained OTFs may be generated by the interpolation process using the obtained OTF. A position on the image from which the OTF is obtained may be a position corresponding to each shift-invariant region illustrated in FIG. 2 or by calculating the obtained OTF through a measurement.

Next, in the step S104, the image processing apparatus calculates a frequency characteristic of the resolution enhancement process as a characteristic of the resolution enhancement process. More specifically, the image processing apparatus calculates the frequency characteristic $\lambda^f(u, v)$ of the resolution enhancement process by the expression (4) using the intensity of the image restoration process designated by the user and the OTF obtained in the step S103. Since H(u, v) is the OTF in the expression (4), the frequency characteristic $\lambda^f(u, v)$ of the resolution enhancement process is the frequency characteristic corresponding to the optical characteristic (OTF) of the image capturing optical system.

When it is assumed that $H_{m,n}(u, v)$ is OTF that represents the region (m, n) illustrated in FIG. 2, the expression (4) can be rewritten as the following expression (8).

$$\lambda^f_{m,n}(u, v) = \frac{1}{H_{m,n}(u, v)} \frac{|H_{m,n}(u, v)|^2}{(|H_{m,n}(u, v)|^2 + \Gamma_{m,n})} \quad (8)$$

The frequency characteristic $\lambda^f(u, v)$ of the resolution enhancement process can be calculated for each region (m, n) by the expression (8).

The intensity of the image restoration process may be selected in a numerical range from 0 to 100 which user can easily recognize. The image processing apparatus calculates and sets the gain of the frequency signal in the actually used image restoration process. The gain of this frequency signal (referred to as a "frequency gain" hereinafter) is calculated as an absolute value ($|\lambda^f_{m,n}(u, v)|$) of the frequency characteristic ($\lambda^f_{m,n}(u, v)$) expressed by the expression (8) and controlled by $\Gamma_{m,n}$. The frequency gain may be, for example, a value $|\lambda^f_{m,n}(U, V)|$ at a specific frequency (U, V) or a maximum value or a mean value in a band expressed by $|\lambda^f_{m,n}(u, v)|$.

Next, in the step S105, the image processing apparatus obtains a resolution enhanced image (first image) by performing an image restoration process based on the frequency characteristic $\lambda^f_{m,n}(u, v)$ of the calculated resolution enhancement process for the captured image. An appropriate image restoration process can be performed for each region (m, n) by using the frequency characteristic $\lambda^f_{m,n}(u, v)$ of the resolution enhancement process calculated for each region (m, n). Moreover, an interpolation process that does not generate a block noise etc. in switching the region can result in a resolution enhancement process with a better image restoration process.

The image restoration process may be performed by convoluting a captured image with a filter (image restoration filter) in a real space obtained by inversely Fourier-transforming the expression (8). The previously generated filter in the real space may be stored in the OTF database and used.

Next, in the step S106, the image processing apparatus calculates a noise gain A(m, n) in the region (m, n) based on the frequency characteristic $\lambda^f_{m,n}(u, v)$ of the resolution enhancement process performed in the region (m, n) in the captured image. The noise gain for the filter in the real space stored in the OTF database may use information previously stored in the OTF database with the filter in the real space or information obtained by Fourier-transforming the filter in the real space.

As described above, since $H_{m,n}(u, v)$ that is the OTF of the image capturing optical system is different for each shift-invariant region, the resolution enhancement process may be performed based on the frequency characteristic $\lambda^f_{m,n}(u, v)$ for each shift-invariant region. Hence, the resolution enhanced image contain the noise amplified based on the frequency characteristic $\lambda^f_{m,n}(u, v)$ in the resolution enhancement process in the shift-invariant region. In other words, the noise gain is different for each region (m, n) in the resolution enhanced image.

Accordingly, the image processing apparatus calculates the gain A(m, n) in the region (m, n) in the resolution enhanced image. The gain A(m, n) by the resolution enhancement process in the region (m, n) is calculated based on the frequency characteristic $\lambda^f_{m,n}(u, v)$ of the resolution enhancement process by the expression (9). In the expression (9), N is the data number of the frequency characteristic $\lambda^f_{m,n}(u, v)$ of the resolution enhancement process.

$$A(m, n) = \frac{1}{N} \sum \sum |\lambda^f_{m,n}(u, v)|^2 \quad (9)$$

Figure 3:
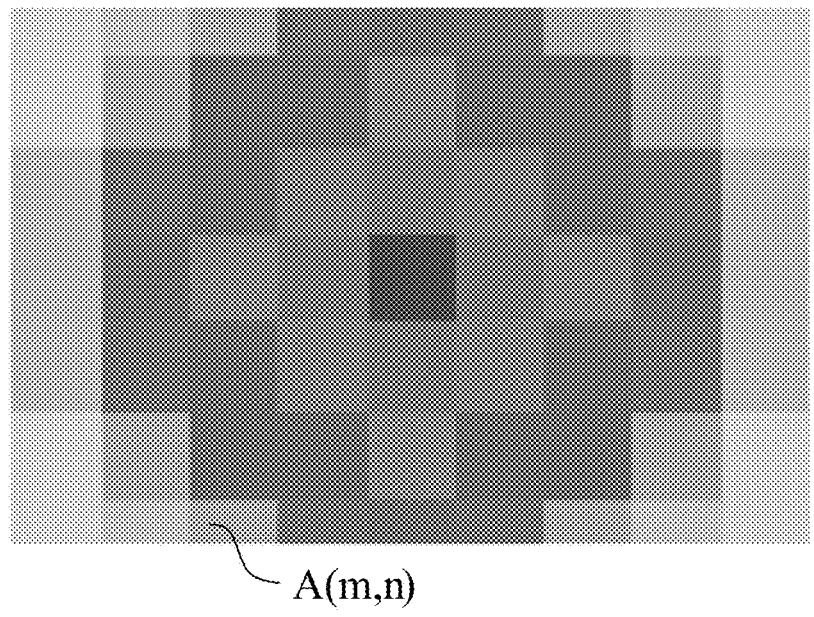
FIG. 3 is a view illustrating a gain for each region in a resolution enhanced image according the first embodiment.

FIG. 3 illustrates the gain A(m, n) in the region (m, n) of the calculated resolution enhanced image. The gain A is larger as the region is brighter.

Next, in the step S107, the image processing apparatus calculates a noise amount (second noise amount) σ(m, n) in the region (m, n) in the resolution enhanced image. The second noise amount σ(m, n) in the region (m, n) is calculated by the following expression (10), the first noise amount $\sigma_0$ contained in the captured image obtained in the steps S102, and the gain A(m, n) in the region (m, n) calculated in the step S106. In other words, since the gain A(m, n) is calculated from the frequency characteristic $\lambda^f_{m,n}(u, v)$ of the resolution enhancement process using the expression (9), the second noise amount σ(m, n) is calculated with the first noise amount and the frequency characteristic $\lambda^f_{m,n}(u, v)$ of the resolution enhancement process.

$$\sigma(m,n) = \sqrt{\sigma_0^2 \times A(m,n)} \quad (10)$$

Next, in the steps S108 to S112, the image processing apparatus performs a noise reduction process for a noise reduction target image based on the calculated second noise amount σ(m, n). Herein, the noise reduction target image may be the resolution enhanced image or an image obtained from the resolution enhanced image. The image obtained from the resolution enhanced image includes, but is not limited to, an image obtained by frequency-decomposing the resolution enhanced image. In this case, the steps S106 an S107 may be performed for each image obtained by frequency-decomposing the resolution enhanced image.

Next follows a detailed description of a noise reduction process using a NLM filter.

In the step S108, the image processing apparatus extracts data (first partial image referred to as "target data" hereinafter) of a partial region that contains a target pixel (object pixel) from the noise reduction target image. The target data is data of the partial region that contains only the target pixel(s) as an object of the noise reduction process or the target pixel(s) and peripheral pixel(s) around the target pixel(s). Since the target data needs to have information on a pixel value distribution, the partial region from which the target data is extracted (referred to as a "target data region" hereinafter) needs to contain a plurality of pixels. When the target pixel includes only one pixel, the number of pixels in the target data region is necessarily more than the number of target pixels.

Figure 4:
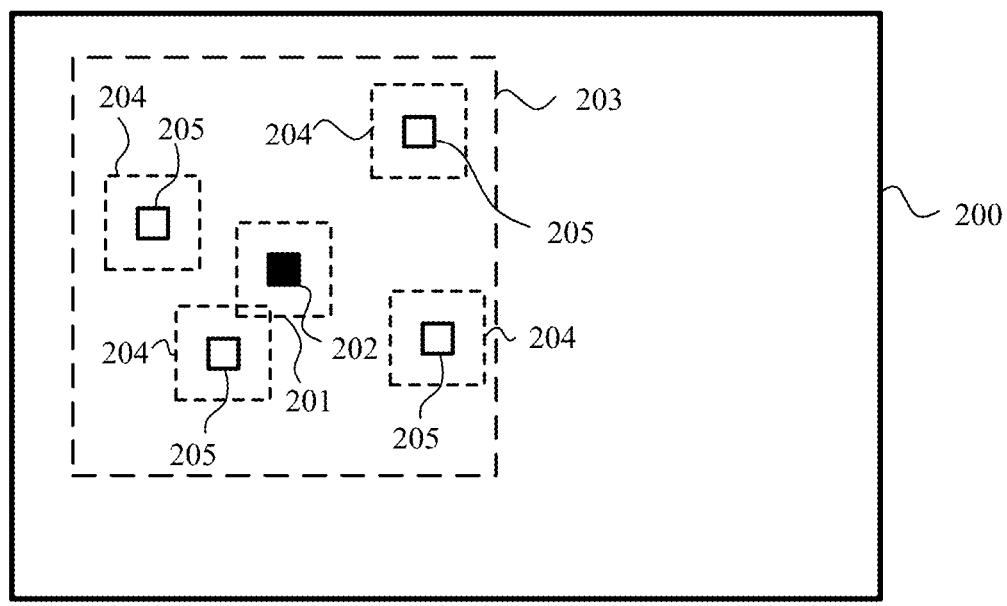
FIG. 4 is a view relating to acquisitions of target data and reference data according to the first embodiment.

For example, as illustrated in FIG. 4, the target data is extracted from a target data region 201 that contains a target pixel 202 in the noise reduction target image 200. Herein, the target pixel 202 includes only one pixel, and the target data is set to data of the target data region 201 that includes a plurality of pixels and the target pixel 202. However, a size, a shape, and an extraction position of each of the target pixel and the target data region are not limited to those illustrated in FIG. 4.

Next, in the step S109, the image processing apparatus extracts data of a plurality of partial regions (a plurality of second partial images referred to as "plural pieces of reference data" hereinafter) from the noise reduction target image. Plural pieces of reference data is data of the partial region that contains a reference pixel or reference pixels used for the weighted mean, which will be described later.

Since the noise reduction process with the NLM filter uses the self-similarity in the object space, the reference data may be extracted from the noise reduction target image from which the target data has been extracted. The reference data may be obtained from an image that is different from the noise reduction target image and contains an object similar to the object in the noise reduction target image.

When the target data has been extracted from a color component, such as a green component, in the noise reduction target image, the reference data may be extracted from another color component, such as a red component and a green component, in the noise reduction target image.

When the reference data is extracted from the target of the noise reduction, data of a shape similar to the target data is likely to exist near the target data region. The noise reduction process may be accelerated by narrowing, to the vicinity of the target data region, a region in which a partial region (referred to as a "reference data region" hereinafter) used to extract the reference data is selectable (referred to as a "reference data extractable region" hereinafter) in the noise reduction target image.

For example, as illustrated in FIG. 4, a reference data extractable region 203 is set (limited) to a region near and around the target data region 201 (or the target pixel 202). A plurality of reference data regions 204 are selected in the reference data extractable region 203, and the reference data is extracted from the reference data region 204. The reference data region 204 may partially overlap the target data region 201 or the other reference data region 204. The reference data region may perfectly overlap the target data region, but may shift from the target data region because the noise reduction process becomes less effective when a weight of the target pixel itself in the weighted mean pixel value, which will be described later, is relatively higher than a weight of another reference pixel.

The size and shape of the reference data extractable region 203, and the size, shape, and position of each of the reference data region 204 and the reference pixel 205 are not limited to those illustrated in FIG. 4.

The reference data extractable region may be set according to a gain (or the frequency characteristic of the resolution enhancement process) in the resolution enhancement process to the target pixel. For example, the reference data extractable region may be set to the region that provides the gain in the preset range based on the gain in the resolution enhancement process to the target pixel. Moreover, the reference data extractable region may be set according to the second noise amount in the target pixel. Thereby, as the second noise amount in the target pixel is larger, the reference data extractable region may be set larger and the noise reduction process can become more effective.

Next, in the step S110, the image processing apparatus calculates a correlation value between the target data extracted in the step S108 and each of plural pieces of reference data extracted (or obtained) in the step S109. A feature amount based method, such as SIFT (Scale-Invariant Feature Transform) and SURF (Speeded-Up Robust Features) and a region based method, which will be described later, can be used to calculate the correlation value. The feature amount based method can calculates the correlation value because this method addresses the feature amount of the data, even when the number of pixels is different between the target data and the reference data. On the other hand, the region based method cannot correctly calculate the correlation value if the number of pixels is not equal to each other between both data because this method addresses a difference of the pixel value for each pixel between both data. However, the region based method has an advantage in more highly precisely determining the similarity than the feature amount based method.

As an illustrative region based calculation method of a correlation value, a description will be given of a method using a square mean root of a difference between target data and the reference data for each corresponding pixel. A region based calculation method of the correlation value is not limited to this example. While the noise reduction target image is monochromatic for simplicity purposes without considering a color component (RGB) in this description, this discussion is applicable to each color component when the noise reduction target image has a plurality of color components.

When the target data and the reference data are treated as image data or a matrix, the correlation value g is expressed by the following expression (11).

$$g(T, R_k) = \frac{1}{NM} \left[ \sum_{i,j} (t_{ij} - r_{ij})^2 \right]^{\frac{1}{2}} \tag{11}$$

Herein, T is a matrix having a plurality of pixel values in the target data as components $t_{ij}$, N is the number of rows, and M is the number of columns. $R_k$ is a matrix having a plurality of pixel values in k-th reference data as components $r_{ij}$. Since the correlation value g expressed by the expression (11) is a value corresponding to a difference between the target data and the reference data, as the correlation value g is close to 0 (or is small), the similarity (correlation) between the target data and the reference data becomes high.

A DC component corresponding to an average value of the brightness of the image may be subtracted based on the pixel values of the target data and the reference data. What is to be determined by the correlation value is how similar the pixel value structure is between the target data and the reference data, and the brightness (DC component) is irrelevant and may be subtracted. The contrast of the reference data may be adjusted so as to maximize the correlation between the target data and the reference data. This way corresponds to a scalar magnification of an AC component of the reference data.

The number of pixels in the target data and the reference data may be set according to the second noise amount in the target pixel. For example, in the noise reduction process for a target pixel having a large second noise amount, the number of pixels is reduced for the target data and the reference data. As the number of pixels is reduced for the target data and the reference data, the correlation value increases and the number of reference pixels having large weights increases. Thereby, the noise reduction process becomes more effective. In the noise reduction process for a target pixel having a small second noise amount, the number of pixels is increased for the target data and the reference data and the noise reduction process becomes less effective.

Next, in the step S111, the image processing apparatus sets the weight given to each reference data based on the correlation value of each reference data calculated in the step S110. Since the reference data having a higher correlation with the target data is more similar to the target data, the weight to such reference data is set to be larger. This configuration can provide the noise reduction process with the reference data while maintaining a pixel value structure of the target data.

In this case, the image processing apparatus sets a weight given to the reference data based on the second noise amount σ(m, n) in the region (m, n) in the resolution enhanced image calculated in the step S107. More specifically, as a noise amount σ(m, n) in the reference data region (region (m, n)) is larger, a weight to the reference data extracted from it is set larger and the effect of the noise reduction process is intensified. For example, the weight is set as in the following expression (12).

$$w_k = \frac{1}{Z}\exp\left[-\frac{g(T, R_k)}{c \times \sigma(m, n)^2}\right] \quad (12)$$

Herein, $w_k$ is a weight given to the k-th reference data, and "c" is a weight adjusting parameter used to adjust the weight. The weight adjusting parameter may be a constant, or varied by the user. Z is a normalization factor of the weight $w_k$ and expressed as follows.

$$Z = \sum_k \exp\left[-\frac{g(T, R_k)}{c \times \sigma(m, n)^2}\right] \quad (13)$$

In setting the weight in the aforementioned manner, the weight may be set based on the correlation value and the second noise amount in the target pixel or based on the correlation value and the mean value or the median in the second noise amount in the target data region. Moreover, the weight may be set based on the second noise amount in the reference data region and the target data region and the correlation value. For example, when the second noise amount in the reference data region is larger than the second noise amount in the target data region, the pixel having a strong noise is referred to and the noise reduction effect is lowered or another problem occurs. Therefore, the weight is set to be small.

The weight calculating method is not limited to this method. For example, the weight may be calculated using the gain A(m, n) by the resolution enhancement process calculated in the step S106. In this case, the acquisition of the first noise amount in the step S102 and the acquisition of the second noise amount in the step S107 may be omitted.

Next, in the step S112, the image processing apparatus calculates a weighted mean pixel value as a weighted mean of the pixel value of the reference pixel in each of the plural pieces of reference data using the weights set to the plural pieces of reference data in the step S111. The pixel value of the target pixel is replaced with the weighted mean pixel value. Thereby, the noise reduction process of the target pixel is completed. A weighted mean pixel value $S_{ave}$ is calculated, for example, by the following expression (14).

$$s_{ave} = \sum_k w_k s_k \quad (14)$$

Herein, $s_k$ is a pixel value of the reference pixel in the k-th reference data. The calculation method of the weighted mean pixel value is not limited. For example, nonlinear coupling may be used.

This step obtains a pixel value by combining and averaging a plurality of weighted pixel values (pixel values of the reference pixels), and reduces the noise. An output pixel in which the noise of the target pixel is reduced is generated by replacing the pixel value of the target pixel with the weighted mean pixel value $s_{ave}$.

When there are a plurality of target pixels contained in the target data, the expression (14) may be calculated for each target pixel and a replacement with the thus calculated weighted mean pixel value $s_{ave}$ may be performed for each target pixel. In this case, another noise reduction process may be simultaneously used. Instead of the replacement with the weighted mean pixel value, a learning type noise reduction process may be performed based on the weighted mean pixel value.

The aforementioned noise reduction process is performed by setting each of all pixels in the noise reduction target image to the target pixel. Therefore, the image processing apparatus generates an output image (second image) for which the noise reduction process has been performed in the step S113. The output image may be generated by setting to the target pixel, each pixel in the partial region in the noise reduction target image and by performing the noise reduction process for each target pixel.

The noise reduction process according to this embodiment is a process based on the second noise amount in the region (m, n) in the noise reduction target image, and is optimized to a noise gain in the resolution enhancement process for each shift-invariant region in the captured image. Hence, the noise reduction process according to this embodiment can provide a good resolution enhanced and noise reduced image in which the noise that would otherwise be amplified by the resolution enhancement process is effectively reduced.

This embodiment has discussed the image restoration process as the resolution enhancement process. As long as the frequency characteristic of the resolution enhancement process can be acquired, the resolution enhancement process, such as an edge enhancement process and a super-resolution process, may be performed and a good resolution enhanced and noise reduced image can be similarly obtained.

Second Embodiment

Figure 5:
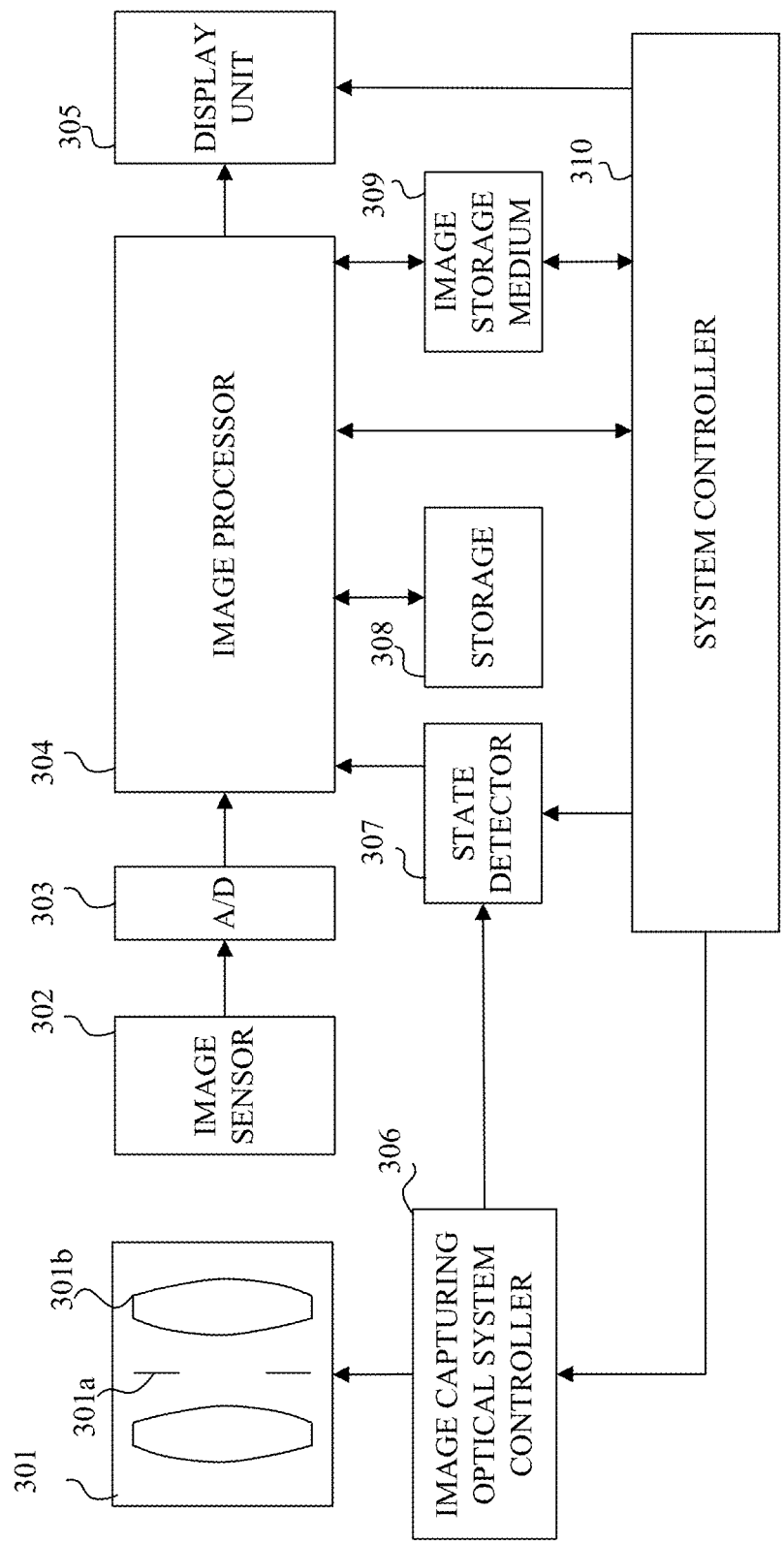
FIG. 5 is a view illustrating an image capturing apparatus that includes an image processing apparatus according to a second embodiment of the present invention.

Next follows a second embodiment according to the present invention. FIG. 5 illustrates an image capturing apparatus that includes an image processor 304 that serves as the image processing apparatus according to the first embodiment. An image capturing optical system 301 includes a diaphragm 301a and a focus lens 301b, and forms an object image using light from the object. The image capturing optical system 301 may be integrally provided with the image capturing apparatus, or interchangeably provided.

An image sensor 302 includes a CCD sensor, a CMOS sensor, etc., captures (photoelectrically converts) an object image formed by the image capturing optical system 301, and outputs an analog signal as an electric signal. The analog signal output from the image sensor 302 is converted by an A/D converter 303 into a digital signal, and input into the image processor 304 as the image processing apparatus.

The image processor 304 generates the captured image by performing a variety of image processes for the input digital signal. The image sensor 302 and the image processor 304 constitute an image capturer. The image processor 304 performs a resolution enhancement process and a noise reduction process described in the first embodiment for the captured image.

The display unit 305 displays a GUI (graphical user interface) for enabling a user to select whether the resolution enhancement process and the noise reduction process are to be performed for the captured image and a GUI for enabling the user to set the intensity of the resolution enhancement process. When the user selects the resolution enhancement process and the noise reduction process and sets the intensity of the resolution enhancement process through the GUI, the image processor 304 performs the resolution enhancement process and the noise reduction process described in the first embodiment for the captured image. When the user previously selects the resolution enhancement process and the noise reduction process and previously sets the intensity of the resolution enhancement process, the image processor 304 may automatically perform the resolution enhancement process and the noise reduction process for the obtained captured image.

In order to make the image processor 304 perform the resolution enhancement process, a state detector 307 obtains image capturing condition information of the image capturing apparatus used to generate the captured image. The state detector 307 may obtain the image capturing condition information from a system controller 310. The image capturing condition information on the image capturing optical system that includes the diaphragm 301a and the focus lens 301b, may be obtained from an image capturing optical system controller 306 that controls an operation of the diaphragm 301a and a movement of the focus lens 301b. The captured image to which the image capturing condition information is added is stored in an image storage medium 309, such as a semiconductor memory and an optical disc, connected to the image processor 304.

The OTF is previously stored in a storage 308 for each combination of the image capturing condition, such as a focal length, an F-number, and an image capturing distance, of the image capturing optical system 301, and a position on the image, and a pixel size in the image sensor 302 (and each identification information when the image capturing optical system 301 is interchangeable).

The image processor 304 outputs an output image generated by the resolution enhancement process and the noise reduction process, to the image storage medium 309 and the display unit 305 so as to make the image storage medium 309 record the output image or make the display unit 305 display the output image. The system controller 310 includes a CPU, a MPU, etc., and controls the above series of operations. The resolution enhancement process and the noise reduction process are the same processes as those described in the first embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

Each embodiment can provide an image processing apparatus, etc. which can effectively reduce a noise that would be otherwise amplified by a resolution enhancement process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-151040, filed Jul. 30, 2015, which is hereby incorporated by reference herein in its entirety.

What is claimed is:

1. An image processing apparatus configured to perform image processing for an input image generated by image capturing through an image capturing optical system, the image processing apparatus comprising:

a first processor configured to generate a first image by performing a resolution enhancement process for the input image; and a second processor configured to generate a second image by performing a noise reduction process for a noise reduction target image, which is the first image or an image generated from the first image, wherein in the noise reduction process, the second processor is configured to:

extract a first partial image containing a target pixel and a plurality of second partial images containing a reference pixel, from the noise reduction target image;

calculate a correlation value between the first partial image and the plurality of second partial images;

provide a weight to each of the plurality of second partial images based on a characteristic of the resolution enhancement process and the correlation value; and calculate a pixel value of the target pixel using a pixel value of the reference pixel in the plurality of second partial images and the weight, and generate the second image using the calculated pixel value.

2. The image processing apparatus according to claim 1, further comprising a noise acquirer configured to acquire a first noise amount contained in the input image, wherein in the noise reduction process, the second processor is configured to:

acquire a second noise amount contained in the first image using the first noise amount and the characteristic of resolution enhancement process; and provide the weight to each of the plurality of second partial images according to the second noise amount and the correlation value.

3. The image processing apparatus according to claim 2, wherein in the noise reduction process, the second processor is configured to provide the weight to each of the plurality of second partial images based on the correlation value and the second noise amount in the target pixel.

4. The image processing apparatus according to claim 2, wherein in the noise reduction process, the second processor is configured to provide the weight to each of the plurality of second partial images based on the correlation value and a mean value or a median of the second noise amount in the first partial image.

5. The image processing apparatus according to claim 2, wherein in the noise reduction process, the second processor is configured to provide the weight to each of the plurality of second partial images based on the correlation value and the second noise amount in the first and second partial images.

6. The image processing apparatus according to claim 2, wherein in the noise reduction process, the second processor is configured to set the number of pixels for the first partial image and the number of pixels for the second partial image based on the second noise amount in the target pixel.

7. The image processing apparatus according to claim 1, wherein in the noise reduction process, the second processor is configured to extract the plurality of second partial images from an extractable region set in the noise reduction target image based on the characteristic of the resolution enhancement process.

8. The image processing apparatus according to claim 1, wherein the first processor performs the resolution enhancement process based on an optical characteristic of the image capturing optical system.

9. The image processing apparatus according to claim 1, wherein the first processor performs the resolution enhancement process based on an optical characteristic of the image capturing optical system which is different for each region in the input image.

10. The image processing apparatus according to claim 1, wherein the characteristic of the resolution enhancement process is a frequency characteristic based on an optical characteristic of the image capturing optical system or a characteristic relating to a noise gain by the resolution enhancement process.

11. An image capturing apparatus comprising:

an image capturer configured to generate a captured image through image capturing by an image capturing optical system; and an image processing apparatus configured to perform image processing for the captured image as an input image, wherein the image processing apparatus includes:

a first processor configured to generate a first image by performing a resolution enhancement process for the input image; and a second processor configured to generate a second image by performing a noise reduction process for a noise reduction target image, which is the first image or an image generated from the first image, wherein in the noise reduction process, the second processor is configured to:

extract a first partial image containing a target pixel and a plurality of second partial images containing a reference pixel, from the noise reduction target image;

calculate a correlation value between the first partial image and the plurality of second partial images;

provide a weight to each of the plurality of second partial images based on a characteristic of the resolution enhancement process and the correlation value; and calculate a pixel value of the target pixel using a pixel value of the reference pixel in the plurality of second partial images and the weight, and generate the second image using the calculated pixel value.

12. A non-transitory computer readable storage medium configured to store an image processing program that enables a computer to perform image processing for an input image generated by image capturing through an image capturing optical system, the image processing comprising:

a first process configured to generate a first image by performing a resolution enhancement process for the input image; and a second process configured to generate a second image by performing a noise reduction process for a noise reduction target image, which is the first image or an image generated from the first image, wherein in the noise reduction process, the second process is configured to:

extract a first partial image containing a target pixel and a plurality of second partial images containing a reference pixel, from the noise reduction target image;

calculate a correlation value between the first partial image and the plurality of second partial images;

provide a weight to each of the plurality of second partial images based on a characteristic of the resolution enhancement process and the correlation value; and calculate a pixel value of the target pixel using a pixel value of the reference pixel in the plurality of second partial images and the weight, and generate the second image using the calculated pixel value.

* * * * *